Nov. 17, 1970             L. J. GUARINO             3,540,986
DISTILLATION CONDENSATION APPARATUS WITH VAPOR
COMPRESSION AND SEMI-PERMEABLE MEMBRANE
Filed Nov. 27, 1968

INVENTOR
Louis Joseph Guarino

United States Patent Office 3,540,986
Patented Nov. 17, 1970

---

3,540,986
DISTILLATION CONDENSATION APPARATUS WITH VAPOR COMPRESSION AND SEMIPERMEABLE MEMBRANE
Louis Joseph Guarino, Box 164,
Washingtonville, N.Y. 10992
Continuation-in-part of application Ser. No. 639,937, May 15, 1967. This application Nov. 27, 1968, Ser. No. 780,936
Int. Cl. B01d *3/10;* C02b *1/06*
U.S. Cl. 202—187                                     3 Claims

ABSTRACT OF THE DISCLOSURE

An apparatus for distilling fluids which includes a housing, a conduit formed of a semipermeable membrane disposed in spaced relation around an impermeable conduit, with the conduits being mounted within the housing. Means are provided for the passage of distilland through space between the permeable and impermeable conduits and means for compressing and passing distilland vapors through the impermeable conduit to increase the heat of the distilland by conduction in the space between the permeable and impermeable conduits.

---

This invention relates in general to apparatus for the separation of volatile substance from liquid or fluid mixtures. It is, in part, a continuation of my application Ser. No. 639,937 filed May 15, 1967 now U.S. Pat. No. 3,454,470.

As described in my application Ser. No. 639,937, distillation through a semipermeable membrane permits the use of inexpensive, corrosion-resistive materials for an evaporative surface. Among other advantages the problem of fouling the evaporative surface by scale accumulation is eliminated. My application Ser. No. 639,937 demonstrates the further advantage of using a rapid circulation of the distilland liquid to increase its rate of evaporation through the semipermeable membrane.

This invention adapts the internal membrane support of my application Ser. No. 639,937 in such manner that provides a conduit path for the compressed vapor in order to permit distillation by vapor compression procedure.

Distillation by vapor compression has gained increasing acceptance for the production of potable water from sea water, It is a process wherein the vapor from heated sea water is compressed and used as a heat supply for further evaporation. Existing vapor compression systems depend upon evaporation from an exposed static surface or a surface that is exposed by a cascade or spray.

The present invention uses a semipermeable conduit as an evaporative surface. Heated distilland liquid is rapidly circulated through this membrane conduit in a path that is provided by the membrane's internal support and the membrane. This support is hollow in order to permit the passage of the compressed vapor. It is preferable for the internal support to have a high heat conductivity value such as the characteristics of stainless steel, copper, or the like material. It is preferable, also, for the internal support to be suitably rigid in order to support the membrane conduit in a predetermined conformity.

The semipermeable membrane conduit permits a rapid circulation of the distilland liquid which in turn causes a higher rate of evaporation through the membrane wall. The porosity of the membrane prevents the passage of chemical contamination and suspended solids, and the rapid circulation of the distilland liquid prevents the accumulation of deposits in the membrane pores. Confinement of the distilland liquid within the membrane conduit permits a wide flexibility in the manner the evaporative surface may be placed. Its position may be in any degree of the horizontal or vertical attitude.

These and other features, capabilities and advantages of the present invention will appear from the subjoined detailed description of one specific embodiment thereof illustrated in the accompanying drawings in which.

Figure 1:
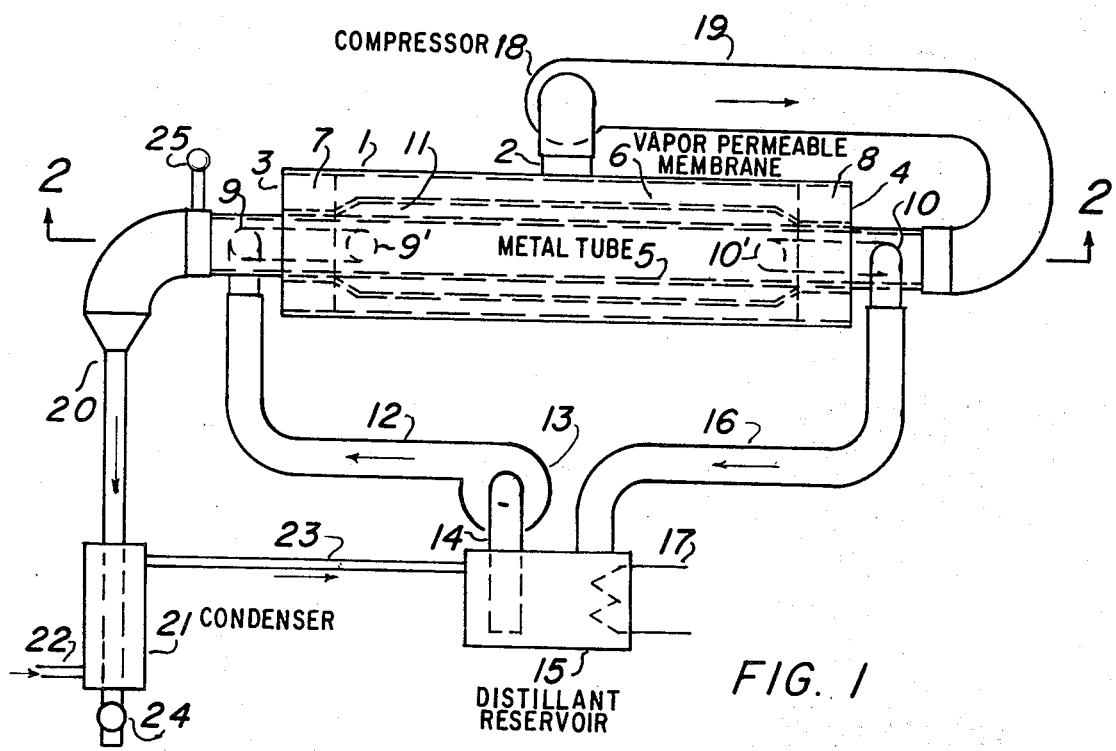
FIG. 1 is a side elevation of one embodiment of the present invention.
Figure 2:
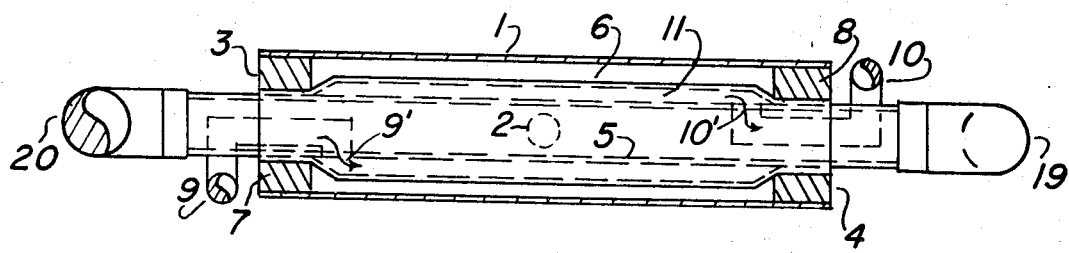
FIG. 2 is a section on the line 2—2 of FIG. 1.

In the embodiment shown in FIG. 1 and FIG. 2, there is illustrated container 1 with nozzle 2 attached thereto for the attachment of compressor 18 for the purpose of compressing the extracted vapor of container 1. Open ends 3 and 4 are provided in container 1 for the purpose of containing internal support 5 with semipermeable membrane tubing 6. Inserts 7 and 8 are affixed to the openings 3 and 4 in such manner to seal the semipermeable membrane tubing 6 to its support 5, and to seal the openings 3 and 4 of container 1. The seals may be further secured by the application of commonly available cements. Support 5 has affixed to it at each of its extremities, conduits 9 and 10 which in turn connect to conduits 12 and 16. Inlet opening 9' is formed in support conduit 5 to provide a passage of distilland liquid from the reservoir into the annular space formed between the semipermeable conduit 6 and the support conduit 5. Similarly, outlet opening 10' is formed remote from inlet opening 9' to provide an outlet passage of distilland liquid from the annular space to the reservoir 15. A circulating pump 13 is connected to conduits 12 and 14 to permit the circulation of distilland liquid from the reservoir 15, and through the channel 11 that is provided by the semipermeable membrane conduit 6 and the support 5. Reservoir 15 may be provided with a heater 17 to increase the temperature of the distilland liquid. Support 5 is a hollow conduit to permit the passage of the compressed distilland vapor from compressor 18 and through conduit 19 which is connected to an extremity of support 5. The compressed vapor passes through support 5 where it releases its heat of compression to the distilland liquid contained in channel 11, thence exiting from support 5 through conduit 20, thence through heat exchanger 21 where its temperature is sufficiently lowered by the cooler distilland liquid which enters the heat exchanger 21 through conduit 22. The distilland liquid exits from the heat exchanger 21 through conduit 23, thence to the reservoir 15. A valve 24 is set at an appropriate opening to control the compressed vapor pressure and to permit the flow of the condensed distilland vapor out of the system. A trap 25 may be installed at the outlet of support 5 to relieve the system of any non-condensible gases that may become entrapped in the extracted distilland vapor.

FIG. 2, which is the sectional view along line 2—2 of FIG. 1, shows a cross section of container 1 with the support 5 and the semipermeable membrane conduit 6. Channel 11 is provided between support 5 and semipermeable membrane conduit 6. Conduits 9 and 10 provide inlet and outlet passages for channel 11. At one end of container 1, insert 7 is shown affixed to opening 3, and at the opposite end of container 1, insert 8 is shown affixed to opening 4. Conduits 19 and 20 are shown attached to opposite ends of support 5 to provide a continuous conduit passage.

When the distilland liquid flows through the channel that is provided by the semipermeable membrane conduit and its support, distilland vapor will pass through the wall of the semipermeable membrane when the vapor pressure of the distilland liquid is higher than the atmosphere surrounding the semipermeable membrane. A circulating pump is used to circulate the distilland liquid. As noted in my application Ser. No. 639,937, the rate of evaporation of the distilland liquid is directly proportional to its rate of flow. Therefore, it is desirable to flow the distilland liquid at the highest rate of flow that is possible.

It is known that when a vapor is compressed, its latent heat is increased. It is desirable to use this heat in such manner that will improve the evaporation process. This is done by compressing the extracted vapor and then to pass the heated vapor through the semipermeable membrane support where the heat of compression is conducted to the distilland liquid as it passes through the channel provided by the semipermeable membrane conduit and its support. The distilland vapor then passes through a heat exchanger where it is condensed to a distilled liquid.

Although this invention relates specifically to distillation by vapor compression, the semipermeable membrane support adapts itself readily to allow heating of the distilland liquid by hot water, steam, or electric heating. Hot water or steam can pass through the support, or the support can be an integral part of an electrical heating system.

It is obvious that various changes and modifications may be made to the details of construction without departing from the general spirit of the invention as set forth in the appended claims.

I claim:

1. In an apparatus for distilling fluids, the combination of a container, a first conduit composed of a semi-permeable membrane disposed in spaced relation and surrounding a second conduit having an impermeable wall, said conduits mounted in said container, the second conduit is formed with the first conduit providing distilland inlet and outlet openings for passing distilland in the space between the first and second conduit, a distilland reservoir, a distilland inlet conduit having distilland circulaing means connected thereto, said inlet conduit mounted between the inlet opening at said second conduit and reservoir, a distilland outlet conduit connected between said outlet opening at said second conduit and said reservoir whereby distilland is conducted in a path from the reservoir through the inlet opening at the second conduit and through the space between said first and second conduit and then through the outlet opening to return through said distilland outlet conduit to said reservoir, a compressor, a nozzle connected between the compressor and the container means connecting said compressor with one end of said second conduit, a heat exchanger, means connecting said heat exchanger with the other end of the second conduit so that compressed distilland vapors are conducted through said second conduit to heat the distilland in the space between the first and second conduit by conduction and conduit means connecting said heat exchanger with said reservoir to provide distilland which is heated by conduction in said heat exchanger while cooling and condensing said distilland vapors.

2. An apparatus for distilling fluids as set forth in claim 1 wherein said reservoir is provided with heat means to heat the distilland thereby facilitating the passage of distilland vapors through the wall of the permeable conduit.

3. An apparatus for distilling fluids as defined in claim 1 wherein means connected to the container for compressing and passing distilled vapors through the impermeable conduit includes a compressor, a nozzle mounted between the compressor and the container, a conduit connected between the compressor and one end of the impermeable conduit, a heat exchanger, a conduit connected between the heat exchanger and the other end of the impermeable conduit whereby distilled vapors passing through the wall of the permeable conduit are compressed and conducted through the impermeable conduit and then are condensed in said heat exchanger to recover distilled liquid from the distilland.

References Cited

UNITED STATES PATENTS

| 2,386,826 | 10/1945 | Wallach et al. | 202—197 |
| 2,441,361 | 5/1948 | Kirgan | 202—181 |
| 3,129,145 | 4/1964 | Hassler | 203—10 |
| 3,161,574 | 12/1964 | Elam | 202—236 |
| 3,240,683 | 3/1966 | Rodgers | 202—173 |
| 3,303,105 | 2/1967 | Konikoff et al. | 203—11 |
| 3,340,186 | 9/1967 | Weyl | 203—11 X |
| 3,361,645 | 1/1968 | Bodell | 202—177 |
| 3,405,058 | 10/1968 | Miller | 203—11 X |

OTHER REFERENCES

"Vaporization Through Porous Membranes" by M. E. Findley, ALCHE.'s Meeting, May 15–18, 1966.

NORMAN YUDKOFF, Primary Examiner

F. E. DRUMMOND, Assistant Examiner

U.S. Cl. X.R.

202—200, 236; 203—26; 210—22